United States Patent
Pence et al.

(10) Patent No.: US 10,462,980 B2
(45) Date of Patent: Nov. 5, 2019

(54) OFFSET STACKED VERTICAL PLANTING CONTAINERS

(71) Applicants: Christopher A. Pence, Oceanside, CA (US); Edmond Chung, Arlington, WA (US)

(72) Inventors: Christopher A. Pence, Oceanside, CA (US); Edmond Chung, Arlington, WA (US)

(*) Notice: Subject to any disclaimer, the term of this patent is extended or adjusted under 35 U.S.C. 154(b) by 0 days.

(21) Appl. No.: 15/413,430

(22) Filed: Jan. 24, 2017

(65) Prior Publication Data
US 2017/0318752 A1    Nov. 9, 2017

Related U.S. Application Data

(63) Continuation of application No. 14/146,546, filed on Jan. 2, 2014, now Pat. No. 9,549,508.

(51) Int. Cl.
*A01G 25/00* (2006.01)
*A01G 9/02* (2018.01)

(52) U.S. Cl.
CPC .................................. *A01G 9/023* (2013.01)

(58) Field of Classification Search
CPC .......... A01G 9/023; A01G 9/022; A01G 9/02; A01K 63/00; A01K 63/003
USPC ...................................................... 47/82, 83
See application file for complete search history.

(56) References Cited

U.S. PATENT DOCUMENTS

| | | | | |
|---|---|---|---|---|
| 440,141 A | * | 11/1890 | Dearborn | A01G 1/08 47/33 |
| 3,076,290 A | * | 2/1963 | Gallo | A47G 7/041 206/423 |
| 3,137,095 A | * | 6/1964 | Pearson | A01G 9/023 47/83 |
| 3,528,585 A | * | 9/1970 | Kalmar | B65D 21/0235 206/509 |
| 3,686,791 A | * | 8/1972 | Mills | E04C 1/395 47/83 |
| 4,057,931 A | * | 11/1977 | Stutelberg | A01G 9/023 206/509 |
| 4,355,485 A | * | 10/1982 | Frank | A01G 9/023 47/82 |
| 5,136,807 A | * | 8/1992 | Orlov | A01G 27/005 47/83 |
| 6,134,832 A | * | 10/2000 | Bokmiller | A01G 9/021 206/509 |
| 6,840,008 B1 | * | 1/2005 | Bullock | A01G 9/023 47/82 |
| 7,043,877 B1 | * | 5/2006 | Jensen | A01G 9/023 47/82 |

(Continued)

*Primary Examiner* — Kristen C Hayes
(74) *Attorney, Agent, or Firm* — John R. Ross; John R. Ross, III

(57) ABSTRACT

Stacked growing containers. The growing containers are stacked so that they are offset to each other in order to expose their corners to optimum light. Each growing container has a locking mechanism to ensure that the growing containers are locked into their correct offset position. Also each growing container has a drainage hole. A drainage container is positioned below the stack of growing containers and receives the excess water from the stack. Piping may be used to remove and redirect the excess water from the drainage container if required. In a preferred embodiment the growing containers are offset by 45 degrees.

10 Claims, 7 Drawing Sheets

(56) References Cited

U.S. PATENT DOCUMENTS

| | | | | |
|---|---|---|---|---|
| 7,044,483 B2* | 5/2006 | Robertson | ............ | A47F 3/0486 |
| | | | | 206/505 |
| 7,617,632 B1* | 11/2009 | Imm | ............... | A01G 9/023 |
| | | | | 47/39 |
| 7,690,151 B2* | 4/2010 | Wilkes | ............... | A01G 9/023 |
| | | | | 47/82 |
| 7,730,667 B2* | 6/2010 | Keats | ............... | B65D 21/043 |
| | | | | 47/79 |
| 7,913,452 B1* | 3/2011 | Imm | ............... | A01G 9/124 |
| | | | | 47/39 |
| 8,191,310 B2* | 6/2012 | Keats | ............... | B65D 21/043 |
| | | | | 47/79 |
| 8,261,913 B2* | 9/2012 | Keats | ............... | A01G 9/023 |
| | | | | 206/423 |
| 2005/0173431 A1* | 8/2005 | Robertson | ............ | A47F 3/0486 |
| | | | | 220/23.6 |
| 2007/0180766 A1* | 8/2007 | Wilkes | ............... | A01G 9/023 |
| | | | | 47/83 |
| 2007/0186469 A1* | 8/2007 | Keats | ............... | B65D 21/043 |
| | | | | 47/83 |
| 2008/0216403 A1* | 9/2008 | Schmidt | ............... | A01G 9/023 |
| | | | | 47/83 |
| 2010/0146854 A1* | 6/2010 | Cannon | ............... | A01G 9/023 |
| | | | | 47/82 |
| 2010/0229464 A1* | 9/2010 | Wilkes | ............... | A01G 9/023 |
| | | | | 47/82 |
| 2010/0287833 A1* | 11/2010 | Keats | ............... | B65D 21/043 |
| | | | | 47/81 |
| 2015/0128494 A1* | 5/2015 | Peterson | ............... | A01G 9/023 |
| | | | | 47/82 |

* cited by examiner

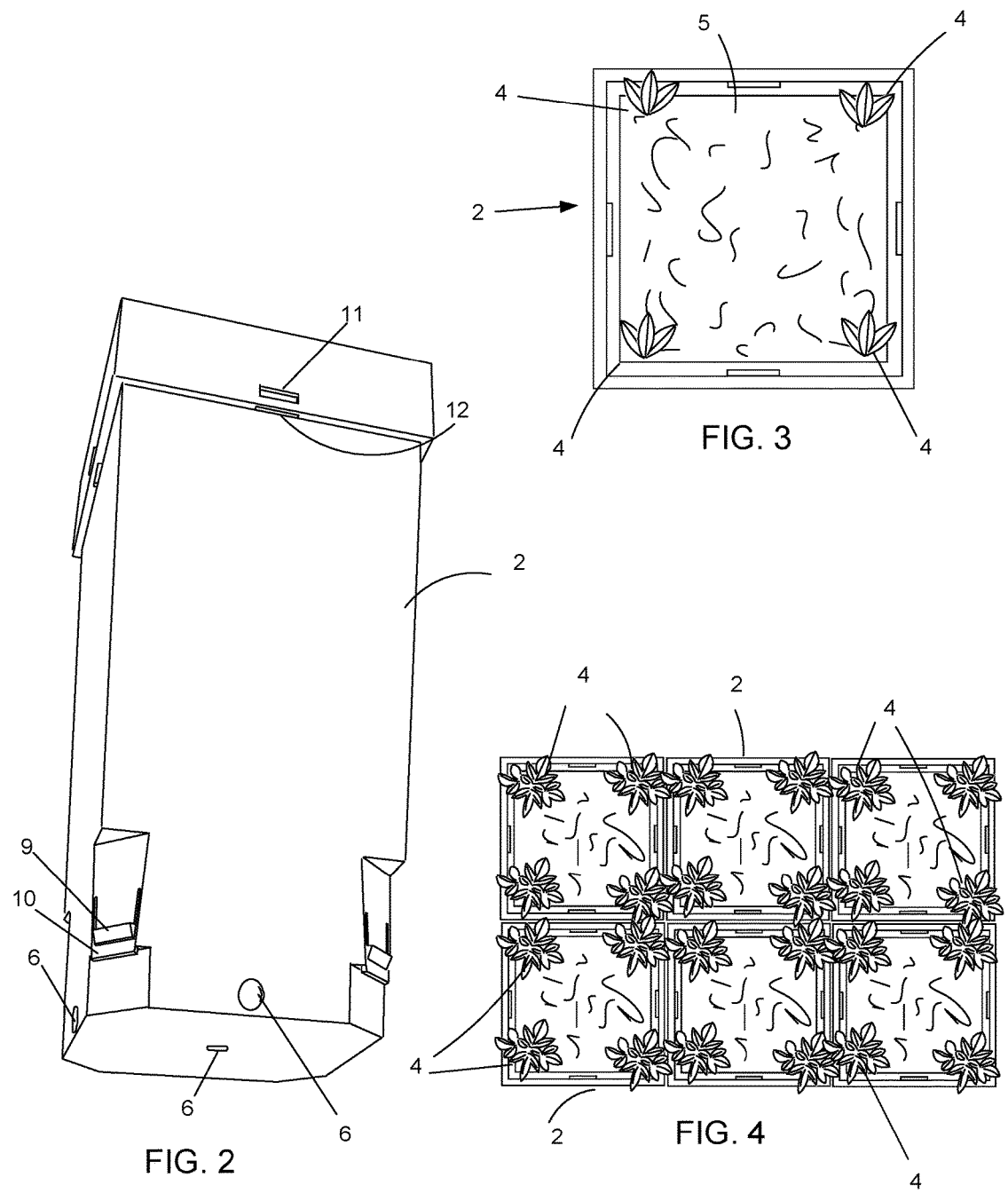

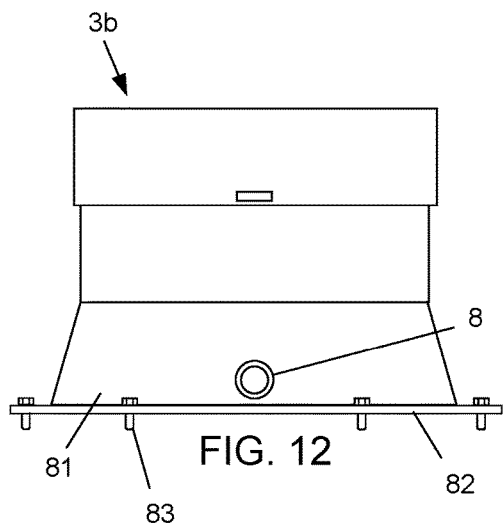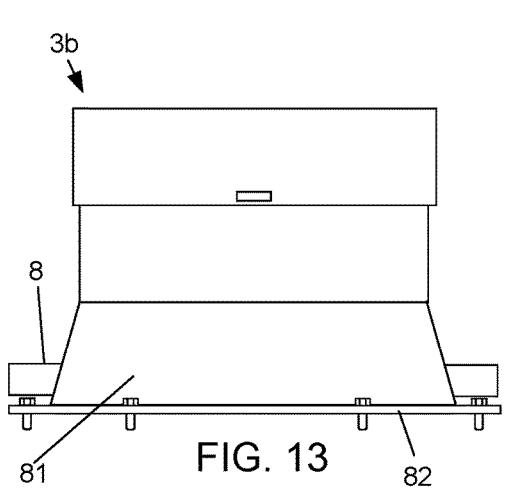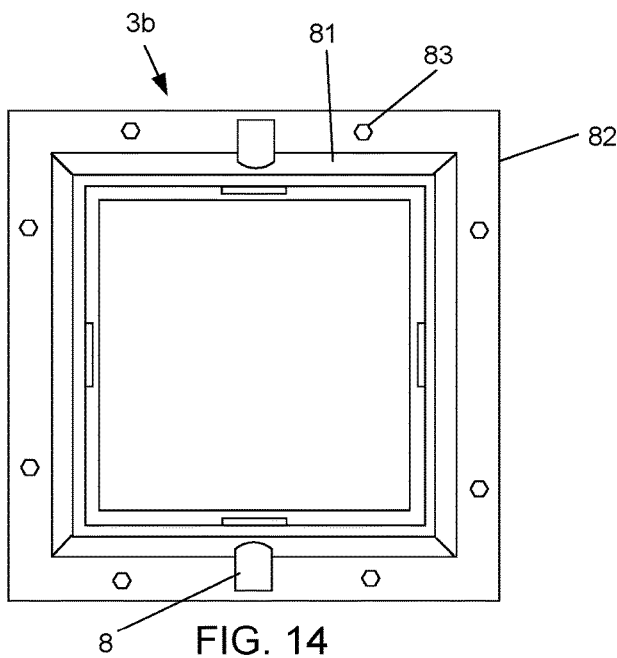

OFFSET STACKED VERTICAL PLANTING CONTAINERS

The present invention relates to planting systems, and in particular, to vertical planting systems. The present invention is a Continuation of U.S. patent application Ser. No. 14/146,546, filed Jan. 2, 2014 (which issued as U.S. Pat. No. 9,549,508 on Jan. 24, 2017), all of which is incorporated by reference herein.

BACKGROUND OF THE INVENTION

Hydroponics is known. Hydroponics is a method of growing plants using mineral nutrient solutions in water. Terrestrial plants may be grown with their roots in the mineral nutrient solution only or in a growing medium, such as perlite, gravel, biochar, mineral wool, expanded clay pebbles or coconut husk.

Researchers discovered in the 18th century that plants absorb essential mineral nutrients as inorganic ions in water. In natural conditions, soil acts as a mineral nutrient reservoir but the soil itself is not essential to plant growth. When the mineral nutrients in the soil dissolve in water, plant roots are able to absorb them. When the required mineral nutrients are introduced into a plant's water supply artificially, soil is no longer required for the plant to thrive. Almost any terrestrial plant will grow with hydroponics. Hydroponics is also a standard technique in biology research and teaching.

Vertical planting systems are known. Vertical planting systems are desirable anywhere intense hydroponic agricultural cultivation is undertaken such as in greenhouses or in areas in which space is an issue, such as on a rooftop, indoors, or on a small piece of land, such as a typical backyard.

Existing vertical planting systems include a solid single column that has holes or cups installed at intervals along the column and at various positions around the columns circumference. Another prior art system has stackable units that also utilize holes spaced at various vertical and horizontal intervals. The prior art systems do not disclose a system that allows for easy maturation of cuttings in a final media prior to placement in the column. Also, the prior art systems do not disclose stacking system of planting containers that allows for secure stacking and optimum growing conditions.

What is needed is a better vertical planting system.

SUMMARY OF THE INVENTION

The present invention provides stacked growing containers. The growing containers are stacked so that they are offset to each other in order to expose their corners to optimum light. Each growing container has a locking mechanism to ensure that the growing containers are locked into their correct offset position. Also each growing container has a drainage hole. A drainage container is positioned below the stack of growing containers and receives the excess water from the stack. Piping removes the excess water from the drainage container. In a preferred embodiment the growing containers are offset by 45 degrees.

BRIEF DESCRIPTION OF THE DRAWINGS

FIG. 2 shows a preferred growing container.
FIG. 3 shows a preferred growing container filled with growing medium and rooted cuttings.
FIG. 4 shows a plurality of growing containers laid side to side.
FIGS. 12-14 show another preferred drainage container.

DETAILED DESCRIPTION OF THE PREFERRED EMBODIMENTS

Figure 1:
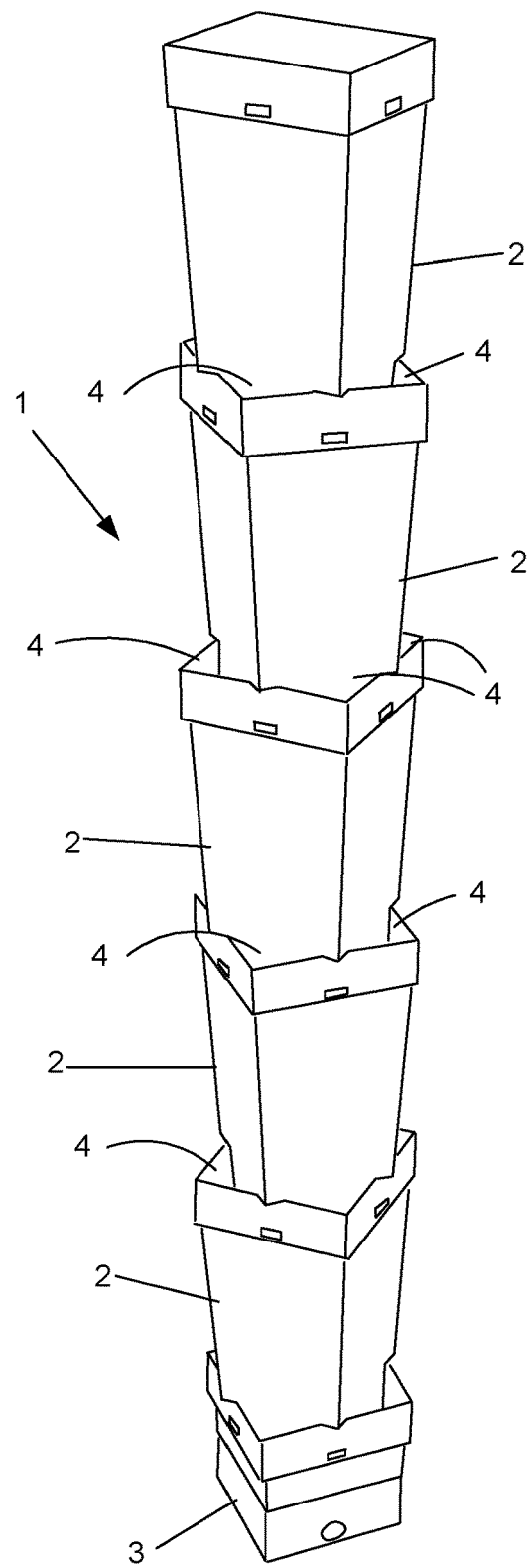
FIG. 1 shows a preferred growing column.
Figure 11:
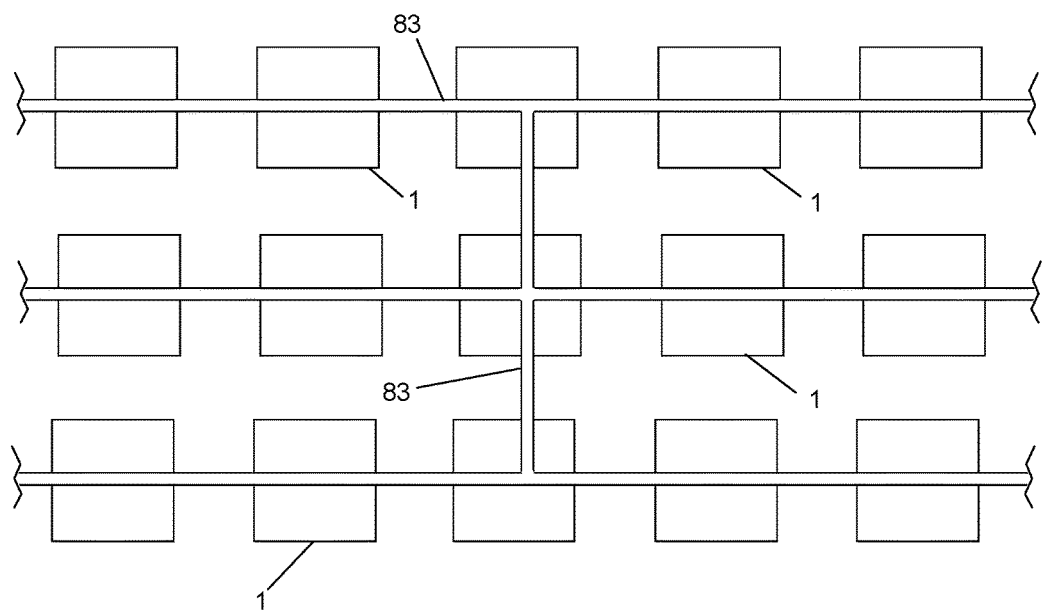
FIG. 11 shows multiple growing columns.

FIG. 1 shows a preferred hydroponic growing column 1. As shown in FIG. 1, growing containers 2 are vertically stacked. Each container 2 is rotated 45 degrees with respect to the adjacent container. Column 1 also includes drainage container 3. By stacking the containers at 45 degrees, optimum growing conditions are achieved. For example, plants are positioned near the exposed corners 4 as they are planted in growing medium contained within each container 2. Therefore plants are exposed to the appropriate amount of light for optimum growing. In one preferred embodiment a small home grower just utilizes one column 1 to grow plants. In another preferred embodiment, multiple columns 1 are set up near each other and are utilized to grow multitudes of plants. For example, FIG. 11 shows multiple growing columns 1 set up adjacent to each other. HDPE tubing 83 is utilized to deliver water and nutrients to columns 1.

Preferred Method for Utilizing the Present Invention

FIG. 2 shows a perspective view of container 2. FIG. 3 shows a top view of container 2. A significant advantage of the present invention is that growing column 1 is created out of a stack of containers 2. This allows for the grower the begin the growing cycle by allowing plants to root while containers 2 are placed side by side (FIG. 4). Then after the plants have successfully rooted containers 2 can be stacked as shown in FIG. 1 to maximize growing potential and efficiently use available space.

To begin growing the user obtains multiple containers 2. In FIG. 3 the user has filled container 2 with growing medium 5. The user has then planted rooted cuttings of plants 4 into each corner of container 2. The user will then provide optimum lighting, fertilizer and water to allow for rooting to complete.

In FIG. 4, the user has placed multiple plants 4 side by side to allow optimum conditions so that plants for are able to complete rooting. After a period of time plants 4 will have successfully rooted and containers 2 will be ready to stack. Alternatively, seedlings in small peat pots may be embedded in soil or other growing medium and be immediately ready to stack. The user then stacks containers 2 so that they are in the positions shown in FIG. 1.

Water Flow

Figure 9:
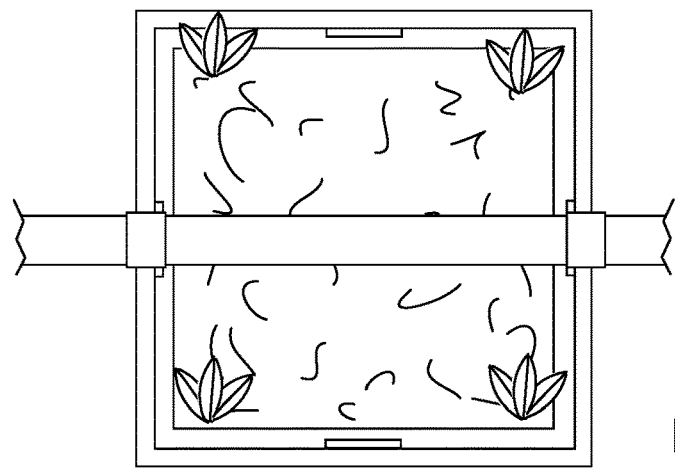

As stated above containers 2 are stacked as shown in FIG. 1. To water or feed the plants in growing column 1, water or nutrient solution is preferably pumped through High Density Polyethylene (HDPE) tubing 83 (FIG. 10) into the topmost container 2. HDPE tubing 83 is used to deliver water and nutrients and is clipped or otherwise secured to the top of each column not only to deliver water but also to provide additional column stability. For example, FIG. 9 shows clips 84 clipped to the upper section of topmost container 2.

Figure 8:
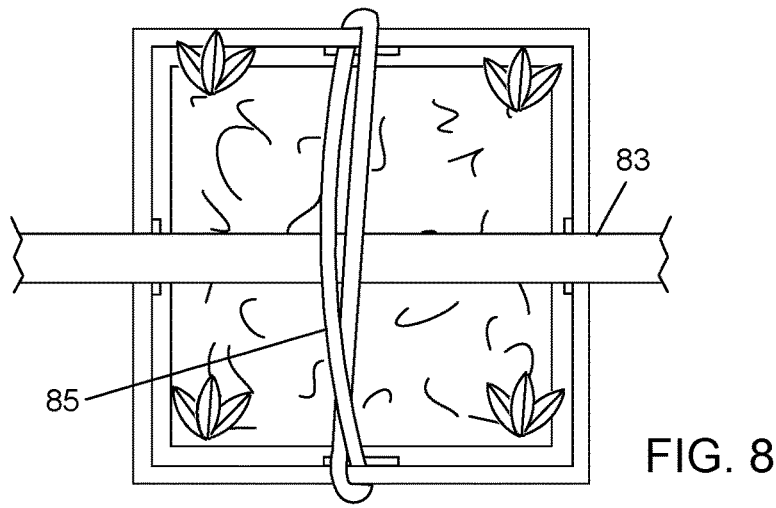
FIGS. 8-10 show a preferred method of water delivery to a growing column.

Likewise, FIG. 8 shows rope 85 utilized to tie topmost container 2 to tubing 83 for stability.

Figure 10:
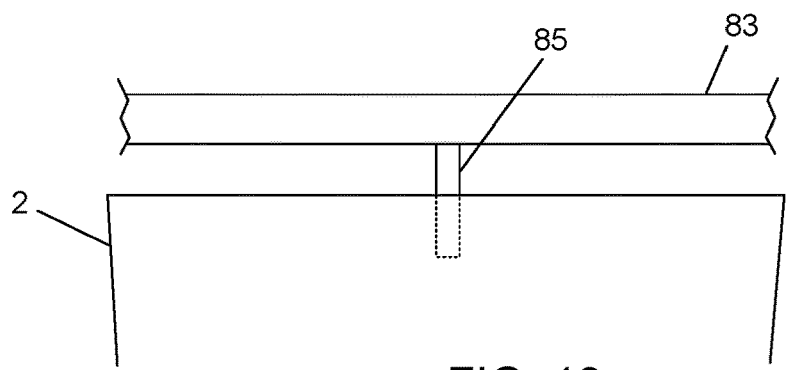

As shown in FIG. 10, HDPE tubing is preferably a ½" pipe and is run along the top of all growing columns 1. Preferably ¼" HDPE tubing 85 extends downward from tubing 83 at each column to deliver the water/nutrients. These are standard drip system elements. Emitters may also be used on the ends of the ¼" delivery tubes if preferred.

As nutrient water is added, it saturates the growing medium in the topmost container 2 and then flows out through holes 6 (FIG. 2) located in the bottom of each container 2. In a similar fashion, water continues to flow down growing column 1, saturating the growing medium in each container and then flowing out holes 6. This continues until water flows into drainage container 3.

Figure 5:
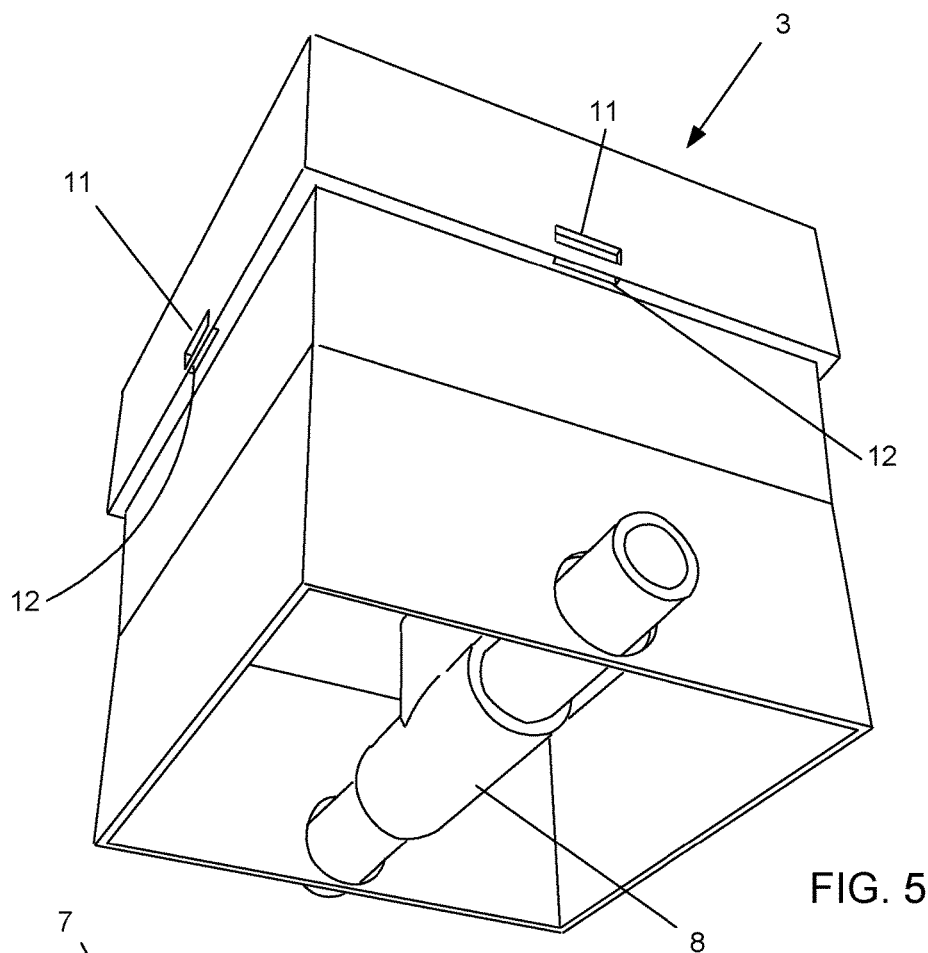
FIGS. 5-6 show a preferred drainage container.
Figure 6:
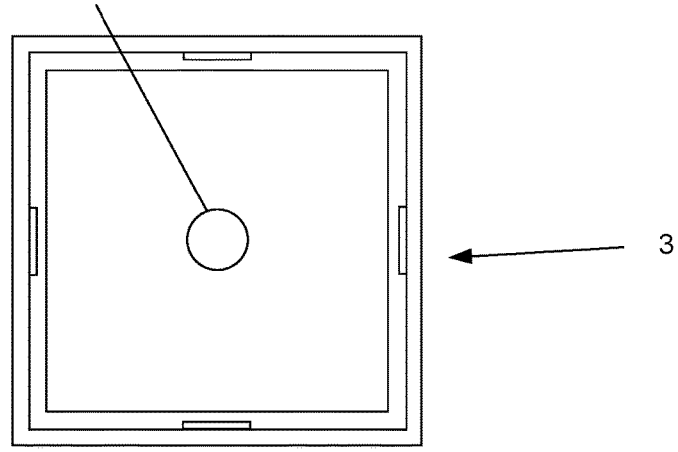

FIG. 5 shows a perspective view and FIG. 6 shows a top view of drainage container 3. Drainage container 3 includes hole 7. Water flows out of holes 6 in the bottom of bottommost container 2 and into container 3. Water then flows out through hole 7 and through standard PVC piping 8 where it is directed to a drainage system, a recycle system or other location desired by the user.

Stacking Mechanism

Figure 7:
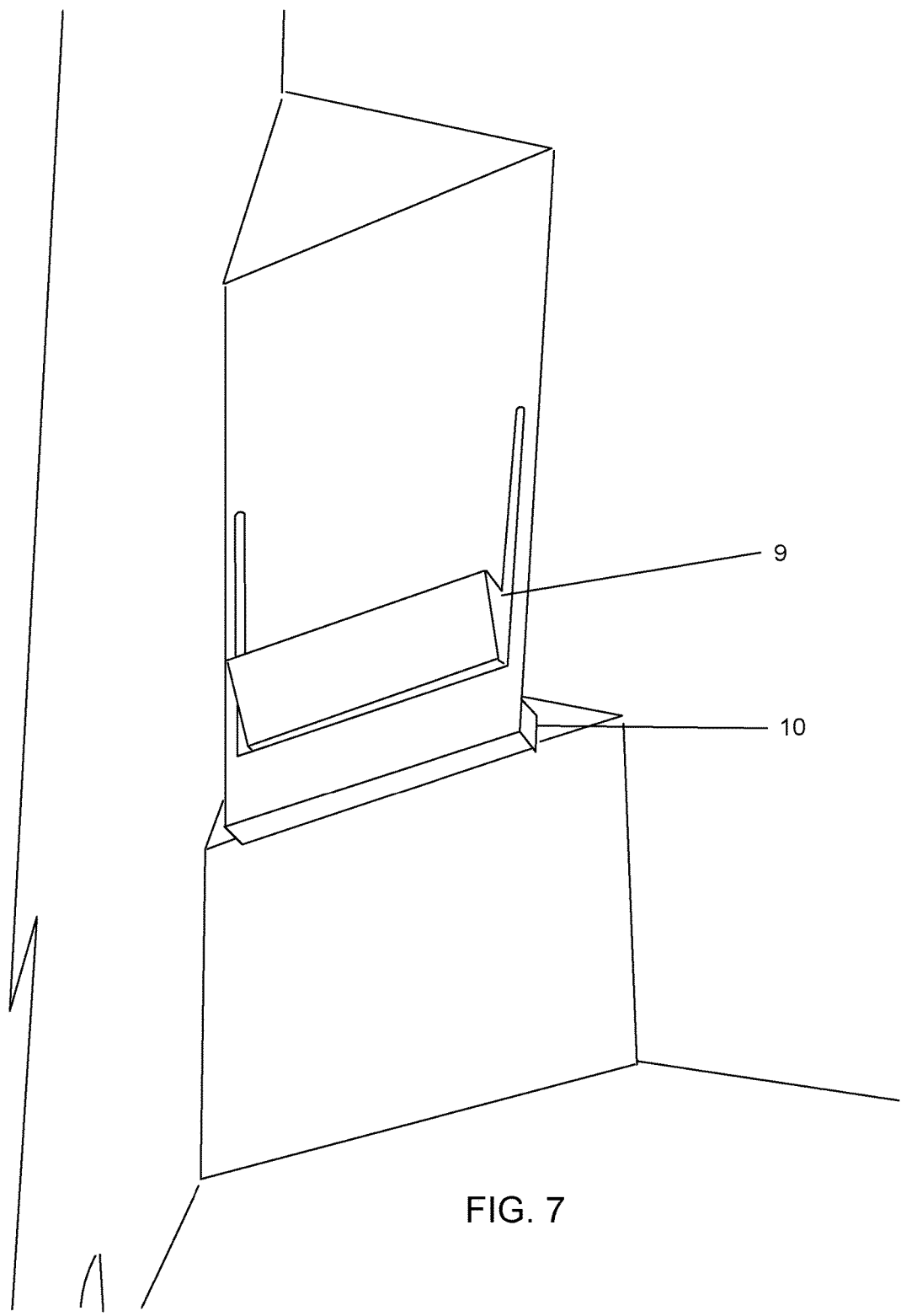
FIG. 7 shows details of preferred locking slots.

As shown clearly in FIG. 1, containers 2 are neatly stacked at a 45 degree offset to each other. This allows for optimum growing conditions in corners 4. A stacking mechanism is utilized to ensure that the containers are appropriately stacked. For example, FIG. 2 shows tab 10 and spring loaded tab 9. Tab 10 slides into slot 12 and spring loaded tab 9 locks into slot 11. FIG. 7 shows a detailed perspective view of spring loaded tab 9 and tab 10.

To lock containers 2 into the position as shown in FIG. 1 the bottommost container 2 is first placed on top of container 3 so that locking tabs 9 and 10 engage slots 11 and 12. Then this procedure is repeated until the desired number of containers 2 has been stacked.

Other Features of the Growing Column

Growing column 1 allows for hydroponic plant culture from rooted cutting to maturity. Column 1 can be used in indoor and outdoor hydroponic growing systems, with or without artificial lighting. It should be noted that the size and proportion of containers 2 can be varied by plant species to be grown. The height of stacked units in an individual growing column will also vary by size and height of containers 2 used. Containers 2 may be filled with a variety of types of growing medium. For example, it may be filled with dirt, soil, vermiculite or any other hydroponic growing medium. Direct sunlight or greenhouse applications may allow multiple plants to be positioned out of multiple corners. Conversely, artificial lighting arrangements will determine plant placement along columns and columns positioned for maximum light exposure. It should also be noted that when not in use, or for shipping, containers 2 may be stacked one inside the other for efficiency.

Alternate Drainage Container

FIGS. 12-14 show a preferred alternate drainage container 3b. Container 3b includes bottom flared portion 81. Adding flared portion 81 increases the stability of growing column 1 by providing it with a wider base. Drainage piping 8 is molded into flared portion 81 and allows for the proper drainage of drainage container 3b. Container 3b also preferably includes flange 82. Flange 82 may be secured to the floor utilizing appropriate fasteners 83 to even further increase stability of growing column 1.

Although the above-preferred embodiments have been described with specificity, persons skilled in this art will recognize that many changes to the specific embodiments disclosed above could be made without departing from the spirit of the invention. For example, in addition to HDPE piping, other types of piping may be utilized such as PVC piping. Therefore, the attached claims and their legal equivalents should determine the scope of the invention.

What is claimed is:

1. A growing column, comprising:
    A. a plurality of growing containers comprising corners stacked at an offset position to each other to expose the corners of said plurality of growing containers to light, each said growing container comprising:
        1. at least one locking mechanism to lock said plurality of growing containers at said offset position, said locking mechanism comprising:
            a. at least one locking tab,
            b. at least one locking slot to engage said at least one locking tab,
        2. at least one hole drainage hole to allow water flow out of said growing container,
    B. a drainage container positioned below said stack of plurality of growing containers, said drainage container for receiving excess water from said stack of plurality of growing containers,
    C. piping connected to said drainage container, said piping for removing excess water from said drainage container.

2. The growing column as in claim 1, wherein said offset position is a forty-five degree offset position and each said growing container is offset forty-five degrees with respect to its adjacent said growing container.

3. The growing column as in claim 1, wherein said at least one locking tab is eight locking tabs and wherein said at least one locking slot is eight locking slots.

4. The growing column as in claim 1, wherein said at least one locking tab is at least one spring loaded locking tab.

5. The growing column as in claim 1, wherein said drainage container comprises,
    A. a flared bottom portion,
    B. a stability flange connected to said flared bottom portion, and
    C. a plurality of fasteners for fastening said stability flange.

6. A method for growing plants in a growing column, said method comprising the steps of:
    A. planting rooted cuttings into a plurality of growing containers, each said growing container comprising:
        1. at least one locking mechanism to lock said plurality of growing containers at said offset position, said locking mechanism comprising:
            a. at least one locking tab,
            b. at least one locking slot to engage said at least one locking tab,
        2. at least one hole drainage hole to allow water flow out of said growing container,
    C. stacking said plurality of growing containers in a stack on top of a drainage container after said rooted cuttings have completed rooting, wherein said plurality of growing containers are stacked at a offset position to each other to expose the corners of said plurality of growing containers to light.

7. The method as in claim 6, wherein said offset position is a forty-five degree offset position and each said growing container is offset forty-five degrees with respect to its adjacent said growing container.

8. The method as in claim 6, wherein said at least one locking tab is eight locking tabs and wherein said at least one locking slot is eight locking slots.

9. The method as in claim 6, wherein said at least one locking tab is at least one spring loaded locking tab.

10. The method as in claim 6, wherein said drainage container comprises,
   A. a flared bottom portion,
   B. a stability flange connected to said flared bottom portion, and
   C. a plurality of fasteners for fastening said stability flange.

\* \* \* \* \*